(No Model.)
C. JACKSON.
MOTOR SLED.
No. 423,161. Patented Mar. 11, 1890.
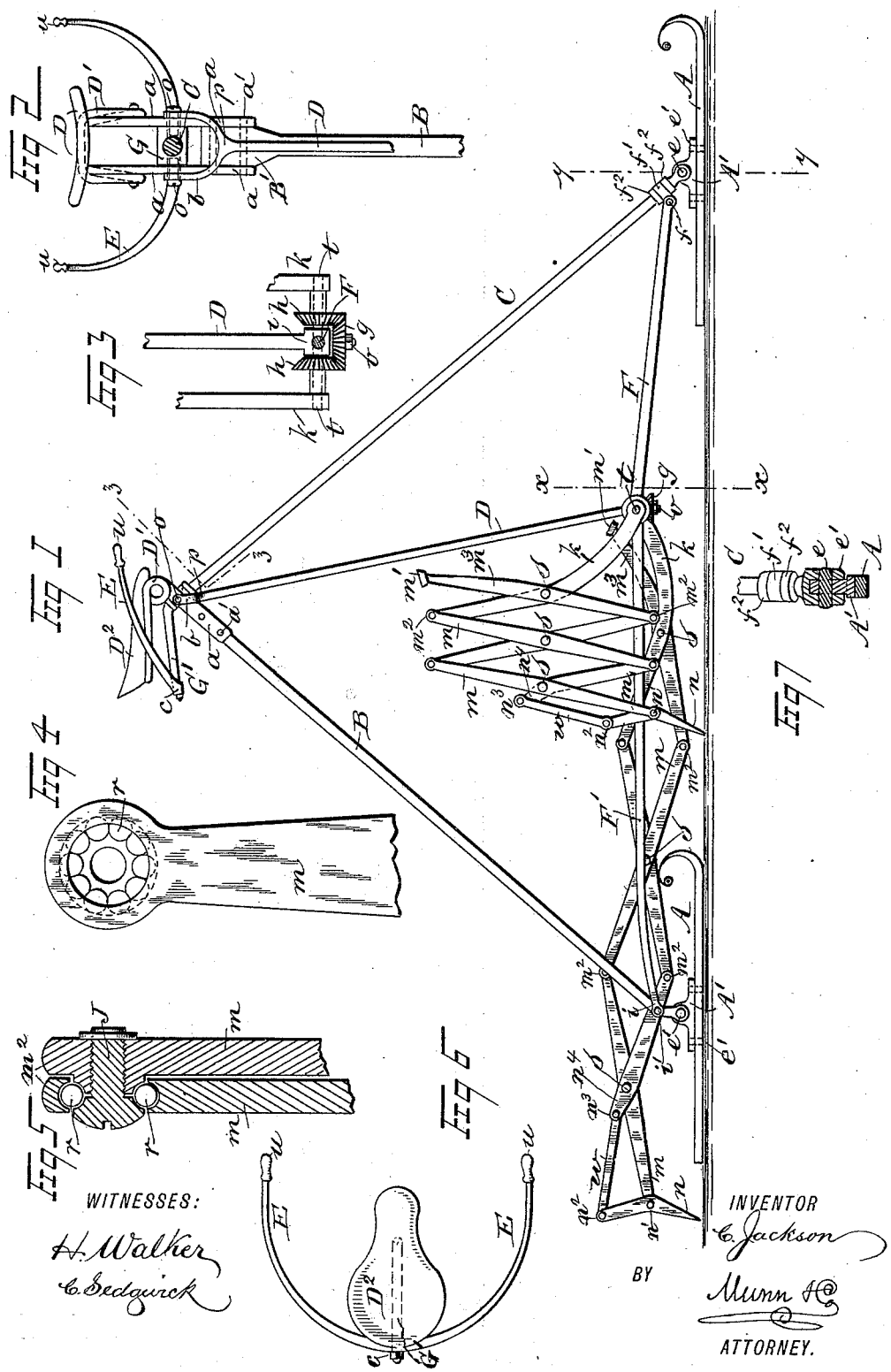

UNITED STATES PATENT OFFICE.

CALVIN JACKSON, OF JACKSONWALD, PENNSYLVANIA.

MOTOR-SLED.

SPECIFICATION forming part of Letters Patent No. 423,161, dated March 11, 1890.

Application filed August 7, 1889. Serial No. 319,994. (No model.)

*To all whom it may concern:*

Be it known that I, CALVIN JACKSON, of Jacksonwald, in the county of Berks and State of Pennsylvania, have invented a new and useful Improvement in Motor-Sleds, of which the following is a full, clear, and exact description.

My invention relates to an improvement in motor-sleds, the objects to be attained being the production of a light, strong, convenient, and handsome sled which may be propelled and guided with ease by the rider, of either sex, on a rising, horizontal, or a downward grade, and afford safety in dismounting therefrom.

With these objects in view my invention consists in features of construction and combinations of parts which will be hereinafter described, and indicated in the claims.

Reference is to be had to the accompanying drawings, forming a part of this specification, in which similar letters of reference indicate corresponding parts in all the figures.

Figure 1 is a side elevation of the complete device. Fig. 2 is a front view of the upper portion of the device, partly in section, on the line $z\ z$ in Fig. 1. Fig. 3 is an enlarged detached view of a portion of the device viewed from the front, it being partly sectional, and taken on the line $x\ x$ in Fig. 1. Figs. 4 and 5 are side and edge views enlarged and detached, representing the preferred method of connecting important parts of the device, Fig. 4 being in section, and showing two pieces secured together by a composite ball-joint bearing and a mating headed stud-bolt. Fig. 6 is a plan view of the rider's seat and the duplex-limbed guiding hand bar or lever; and Fig. 7 is a view, partly in cross-section, of one of the sled-runners and attached parts, taken on the line $y\ y$ in Fig. 1.

It may be stated in brief that the device is designed to be ridden as a bicycle by either sex, it being so constructed that its two runners assume the place of tandem wheels in a bicycle, other parts of the machine being so constructed and arranged that ease, comfort, safety, and pleasure are afforded in a simple and unique vehicle. Its construction is as follows:

The runners A A are rectangular bars of steel having sharp lower edges. (See cross-section in Fig. 7.) These are curved upwardly in a graceful scroll at their front ends and are of sufficient length to afford proper stability to the sled as its base. At points about the center of length of the runners the metal blocks A' are secured, these having rivets or screw-bolts $e'$ inserted through them into the runners. Upwardly-projecting ears are formed on these blocks near their centers, for a purpose which will hereinafter appear. The "backbone" B is an inclined bar having its lower end slotted to embrace the ear on the block A' of the rear runner, to which it is pivoted at $e'$. A steering-rod C, of proper length and diameter and forked at its lower end, loosely embraces the ear of the block A' of the forward runner, to which ear it is pivoted by the rivet or bolt $e$. The steering-rod C is rearwardly inclined at a suitable angle to the forward runner, the upper ends of the backbone B and rod C being connected, in a manner which will be further explained.

Above and near to the forked connection of the rod C with the front runner A two collars $f^2$ are formed on or are affixed to the rod, and between these a loose collar $f'$ is placed, which is held in position by the fixed collars named.

The backbone B terminates at its upper end in a squared block B', (see Fig. 2,) upon the opposite sides of which two bracket-plates $a$ are attached by any suitable means, and between these plates $a$ a block G is pivotally secured.

Two braces F F' are provided to limit the distance between the front and rear runners A, the brace F being slotted at its front end and pivotally secured to the loose collar $f'$ at $f$. (See Fig. 1.) The brace F' is forked at $i$ and pivoted at $i'$ to the backbone B near its point of connection with the block A' of the rear runner.

At $p$ the upright stay-bar D is forked, producing two parallel limbs $b$, which loosely embrace the sides of the block G. The set screw-bolts $o$, penetrating holes made in the limbs, pass through similar holes in the bracket-plates $a$ and firmly engage their threaded ends with tapped perforations made in the block G at proper points to align with the other orifices named, thus securing the stay-bar D in connection with the backbone B. The stay-bar D terminates at its lower end in a rectangular enlargement $i$, (see Fig. 3,) that is perforated to receive the brace F, which is firmly secured thereto. The adjacent end of the other brace F' is inserted in the same block $i$ oppositely to the brace F, being in effect a continuation of the same.

As will be seen, the length of the stay-bar D is so proportioned that the lower braces F F' are slightly elevated at their points of junction therewith, producing an arch which stiffens the triangular frame-work, rendering it capable of sustaining considerable weight at its apex.

The steering-rod C is bent at a point immediately rearward of its loose engagement with the block G, and is continued as a nearly horizontal arm G', (see Fig. 1,) upon the end $c$ of which a U-shaped guiding-bar E is affixed. (See Figs. 1 and 6.)

Upon the upper portions of the bracket-plates $a$ the seat-spring D' is attached by its ends, the looped rear portion of the spring supporting the rider's seat $D^2$ in a manner to afford elasticity and a limited vertical vibration to the seat, whereby shocks or jolting produced by passing over a rough road-bed are absorbed.

The guiding-bar E from its shape and position is located with a portion on each side of the seat $D^2$. These portions are in effect levers for the rocking movement of the steering-rod C. The levers terminate in handles $u$ and are curved upwardly from their point of attachment $c$, so as to locate them within easy reach of the rider's hands, while they are entirely away from contact with the body or limbs of the occupant of the seat.

A transverse shaft $t$ (see Fig. 3) is firmly affixed in the squared enlargement $i$ of the stay-bar D, upon which the duplicate toothed bevel-pinions $h\ h$ are mounted, these pinions being meshed with another bevel-pinion $g$, which is loosely supported on a depending end of the stay-bar below the block $i$ and secured thereon by a set-nut $v$. Each of the pinions $h$ has an integral sleeve-extension, which is affixed by any suitable means to the lower ends of the curved bars $k$, that are perforated in alignment with the bores of the sleeves, and are loosely supported upon the outer end portions of the transverse shaft $t$ in a manner to permit the bars to rock thereon, but be retained from lateral displacement. Two series of bars, preferably consisting of four pieces $m$ in each series, pivoted together at $m^3$ and $s$, so as to produce two sets of "lazy-tongs," are provided. These are connected, as shown, to the curved bars $k$, which are thus made portions of the lazy-tongs. One bar $m^3$ of each series is free at its upper end $m'$, and these are furnished with foot-rests or pedals whereon the rider may press to extend the lazy-tongs, as shown in Fig. 1.

From the geared connection of the two sets of lazy-tongs it is evident that when one set is projected rearwardly by a depression of its pedal $m'$ the other duplicate set will be contracted or closed up, owing to the transmission of motion from one curved bar $k$ to the other one. Upon the rear portions of each set of lazy-tongs a peculiar pushing device is attached, and as these are exactly alike the description of one will suffice for both. One bar on each set of lazy-tongs is made shorter from its pivot $s$ to its upper end $n^3$, producing a fulcrum-bar $n^4$ on each series, and to each fulcrum-bar a link $w$ is pivoted, as at $n^3$, the other end of the link being jointed to the upper terminal $n^2$ of the bent leg $n$, which is pivoted near its center of length at $n'$ to the rearward extremity of the bar $m$. The lower end of the leg $n$ is sharpened or pointed to engage the surface of the frozen road-bed of ice or snow over which the sled is made to travel.

It is important that the lengths of the links $w$, fulcrum-bars $n^4$, and legs $n$ be so proportioned relatively that the pointed ends of the latter will be retained upright, or at a slight incline from the perpendicular, to adapt them to engage the icy surface of the ground and push the entire device and its occupant forward in a straight line when the two runners A are aligned with each other.

As by the rocking depression of the handles $u$ on either side of the sled the front runner will be swung laterally to lead the machine away from a right line, the rider has complete control of the same, and with sufficient practice will be able to propel the device rapidly in any desired direction up or down grade, as well as over a level road-bed.

In order to reduce friction of the joints, these may be furnished with the anti-friction ball-bearing shown in Figs. 4 and 5. This consists of a series of hardened spherical balls $r$, arranged in a cupped recess, the two ends of the bars to be joined being adapted to have proper bearing upon the balls, so as to form an annular cage therefor, as shown in Fig. 5. A stud-bolt J, which has a threaded engagement with the upper end of one of the bars, has its head grooved on the under side, so as to bear upon the series of balls and revolve with but slight friction. The style of connection just described reduces the frictional resistance of joints so constructed and greatly facilitates the easy propulsion of the sled. From the manner of connecting the runners A these will yield or accommodate themselves to the undulations of the ground surface, and in these vibrations from a horizontal plane are independent.

Should it be preferred to make the movement of the lazy-tongs propellers independent, coiled springs may be provided in an obvious manner to retract the legs $n$ when they have been alternately or simultaneously extended rearwardly.

Other slight changes might be made within the manifest scope of my invention; hence I do not desire to limit the form of the parts to the exact shapes shown.

Having thus described my invention, what I claim as new, and desire to secure by Letters Patent, is—

1. A motor-sled having a frame, two runners pivoted on the frame in line with each other, a steering device connected to the front runner, and a pair of lazy-tongs having pusher-legs which are operated by the rider's feet and propel the sled, substantially as set forth.

2. In a motor-sled, the combination, with a frame comprised of a backbone, a depending stay-bar, an arched brace, and a bent steering-rod, of two runners and a lazy-tongs device which operates pusher-legs when actuated by the rider's feet, substantially as set forth.

3. In a motor-sled, the combination, with a backbone, a lower nearly-horizontal brace, a depending stay-bar, and a bent rocking steering-rod, of two independent runners and two sets of lazy-tongs having pusher-legs that are actuated by the rider's feet, substantially as set forth.

4. In a motor-sled, the combination, with a backbone, a nearly-horizontal brace, a stay-bar that connects the brace with the upper end of the backbone, an elastically-supported seat, a bent steering-rod, and a curved rocking guiding-bar secured to the steering-rod, of two independent runners and two sets of lazy-tongs that are provided with pusher-legs and adapted to be actuated by a rider's feet, substantially as set forth.

5. In a motor-sled, the combination, with a frame comprised of a backbone, a forked depending stay-bar, and a nearly-horizontal brace, of a steering-rod bent rearwardly at its upper end and adapted to rock, a U-shaped guiding-bar provided with two handle ends, and an elastically-supported seat mounted on the backbone, substantially as set forth.

6. In a motor-sled, the combination, with a supporting-frame, a rocking steering-rod, a U-shaped guiding-bar having two handle ends, and an elastically-supported seat, of two runners which are adapted to vibrate vertically and independently and two sets of lazy-tongs having pusher-legs and connected by gearing, so that they may be alternately extended and retracted, substantially as set forth.

CALVIN JACKSON.

Witnesses:
JOHN JACKSON,
HENRY M. JACKSON.